(12) United States Patent
Upton et al.

(10) Patent No.: US 6,817,228 B2
(45) Date of Patent: Nov. 16, 2004

(54) METHOD AND APPARATUS FOR DETECTING SEAL FAILURE

(75) Inventors: Mark Upton, Sugar Land, TX (US); Joe Hubenschnmidt, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 130 days.

(21) Appl. No.: 10/113,612

(22) Filed: Apr. 1, 2002

(65) Prior Publication Data

US 2003/0184018 A1 Oct. 2, 2003

(51) Int. Cl.[7] .............................................. G01M 3/08
(52) U.S. Cl. ........................ 73/46; 73/46; 277/318; 277/320; 277/510; 277/512; 277/513
(58) Field of Search ......................... 73/46; 277/318, 277/320, 510, 512, 513

(56) References Cited

U.S. PATENT DOCUMENTS

| | | | | |
|---|---|---|---|---|
| 3,888,495 A | * | 6/1975 | Mayer | ........................ 277/366 |
| 4,197,531 A | | 4/1980 | Wentworth | |
| 4,505,115 A | * | 3/1985 | Arbuckle | ...................... 60/562 |
| 4,922,719 A | * | 5/1990 | Arbuckle | ...................... 60/562 |
| 5,476,079 A | * | 12/1995 | Kanamori et al. | .......... 123/458 |
| 5,607,165 A | | 3/1997 | Bredemeyer | |
| 5,746,435 A | | 5/1998 | Arbuckle | |
| 5,772,216 A | | 6/1998 | Bredemeyer | |
| 5,906,374 A | * | 5/1999 | Arbuckle | .................... 277/304 |

* cited by examiner

*Primary Examiner*—Hezron Williams
*Assistant Examiner*—André K. Jackson
(74) *Attorney, Agent, or Firm*—Thomas O. Mitchell; Robin Nava; Brigitte L. Echols

(57) ABSTRACT

Pumps and valves with movable parts, such as a plunger, typically have seals around the part. The seals may isolate one chamber from another to prevent leakage across the seals. The pressure in one chamber may be different from the pressure in another adjacent chamber, thereby creating a pressure differential across the seal. When the seal is working properly, the pressures in the adjacent chambers remain constant approximately. However, when a seal leaks, pressure will leak across the seal. As such, the chamber with the lower pressure will show an increase in pressure due to seal leakage. Thus, monitoring pressure changes in the chamber with low pressure, or pressure differentials between chambers, serves as an indicator for leakage across the seal and impending seal failure.

15 Claims, 3 Drawing Sheets

METHOD AND APPARATUS FOR DETECTING SEAL FAILURE

TECHNICAL FIELD OF THE INVENTION

The present Invention generally relates to seals, typically dual seals, around movable elements such as moving, in particular reciprocating, elements in valves and pumps. More specifically it relates to apparatus and methods for detecting the failure of such seals.

BACKGROUND

In general, pumps have a variety of applications. For example, these pumps may be used in the oil and gas industry, coal and mining industry, and in sewage treatment plants. In the oil and gas industry, pumps may be, for example, reciprocating pumps. Reciprocating pumps may be used to pump fluids during drilling and completion operations and during various downhole operations such as fracturing, cementing, acidizing and water control. The pumps that perform these downhole completion operations may for example be transported to the well site via a truck or may be on a skid or an offshore platform.

Generally, for cementing operations, a wellbore is drilled and a casing is inserted into the wellbore. The casing is then secured to the wellbore with cement. Typically, a cement slurry is pumped down inside the casing to the bottom of the well and then up between the casing and the wellbore wall until the space between the wellbore and the casing is filled with cement. In hydraulic fracturing or fracture acidizing, fluids or slurries are pumped into wellbores in communication with subterranean formations at pressures and rates sufficiently high to fracture the formation. In acidizing, fluids are pumped into wellbores in communication with subterranean formations at pressures and rates sufficient to force the acid into the formation. In such operations the pumping pressures are typically very high, most typically thousands of pounds per square inch. Thus the fluid being pumped in these operations is at a pressure very much greater than the ambient pressure outside the pump and the flow lines. This is in distinction from such situations as sea-floor pipelines where the fluid being pumped may be at a pressure much lower than the ambient pressure, or various other situations where the pumps and the flow lines, and the fluids therein, may be at essentially the same pressure as the ambient external fluid, such as air at essentially atmospheric pressure.

Pumps that perform cementing, fracturing, acidizing and other operations have movable parts such as plungers and valves. These movable parts may utilize a positive displacement mechanism to move fluid (e.g., cement slurry or hydraulic fracturing slurry) from a reservoir (such as a tank) to the wellbore. The moveable parts are fitted with seals to isolate one chamber from another and prevent the undesired escape of fluid or pressure utilized for pumping. Pumps in such operations may typically reciprocate at 100 to 200 strokes per minute, which is therefore the frequency at which the valves operate, as opposed to valves that more typically operate at rates of from once or twice a minute to once a week or once a month.

If a seal fails, then the pump may also fail. Leakage of fluid past the failed seal may A damage the pump or the environment or cause the pump to stop operating. Thus, if a seal fails it may have to be replaced before the pump is functional again. Alternatively, another pump may have to be brought to the well site, or a standby pump previously brought for such an emergency may have to be used to replace the failed pump. In either case, downhole operations are delayed, the integrity of the operation may be compromised and the cost of the operation may substantially increase.

Detection of such leaks due to seal failure is extremely difficult; anticipation of seal failure is even more difficult. For example, U.S. Pat. No. 4,197,531 describes a method of first determining that an excessive amount of automatic replacement of a fluid between a pair of seals has been necessary and then sounding an alarm. In this apparatus, the pressure of the fluid between the seals is maintained at a pressure slightly higher than the pressure in the region into which the fluid might leak past a failed seal. Similarly, U.S. Pat. No. 5,746,435 describes a method for controlling leakage from a dual seal assembly by the sequence of steps of first placing a barrier fluid between the seals at a pressure above the pressure of the process fluid (for example, a fluid being pumped), second reducing the pressure of the barrier fluid, third detecting an increase in said pressure due to leakage, and finally replacing the removed or lost barrier fluid and calculating the leak rate. Finally, U.S. Pat. No. 5,772,216 describes a dual seal system for a valve in which a load member, that can add sealant from a supply, maintains a sealant above the pressure of both the fluid passing through the valve and the ambient pressure. Leakage of sealant past either seal is detected by monitoring either the volume or the pressure of the sealant supply. This is done either with a single device, internal to the valve, that measures the pressure differential between the sealant supply reservoir and the pressurized sealant between the seals, or by a mechanical device such as an indicator rod in the supply reservoir that shows a change in the sealant supply. In either case, these devices are complicated, specialized, integral parts of the valve or of the sealant supply assembly.

While the very high pressures at which fluids are being pumped in many oilfield operations are generally monitored, a decrease in the pumping pressure is not a good indicator of seal failure for two main reasons. First, initially the leak may cause only a small to drop in the measured pressure of the fluid being pumped; the change may be almost undetectable or may require much more accurate measurement than is usually employed. Second, some fluctuations in the pumping pressure could be normal; a drop in pumping pressure might not indicate a seal leak but might rather indicate only that the pressure in the location into which the fluid is being pumped has dropped for some reason. The typical pressure signal from the high-pressure side of a pump used at high pressures in the oilfield is very noisy and the fluctuations could amount to as much as plus or minus 20% or more.

Measurement only of the pressure on the other side of the seal, the low-pressure region in typical oilfield pumps, is also not a good way to detect seal leaks for several reasons. First, there is a tendency for the pressure on the low-pressure side of the seal to be lower when the high-pressure side pressure is low and higher when the high-pressure side pressure is higher. Consequently, if the pump is used in a low-pressure job and then subsequently in a high-pressure job, the pressure on the low-pressure side will be higher in the second job, but that might not indicate a leak. Second, breaking in of the seal, or the initial presence of foreign material in the low-pressure region might cause pressure fluctuations in the low-pressure region early in the life of the seal that are not really indications of a leak or imminent failure, and that will diminish after the first few jobs.

Thus, there is a continuing need for the simple advanced prediction of failure, or detection of the potential failure, of seals around movable parts in a conventional pump or valve or the like, that allows for replacement of the seals before leakage becomes excessive and performance deteriorates. There is a particular need for a system that does not require highly specialized valves or sealant supplies and does not require the sealant to be maintained above the pressure of both the fluid passing through the valve and the ambient pressure.

SUMMARY

We have found that an improved method of detecting failure or imminent failure of seals is to measure the pressure on both the high-pressure and low-pressure sides and to compare either the ratio of the two or the difference between the two.

In one embodiment, an apparatus is provided for detecting pressure leakage across a seal comprising a first chamber disposed within and bounded by a housing, the first chamber containing a fluid at a first pressure that can be measured; a second chamber forming an annulus containing a lubricant at a second pressure that is less than the first pressure, the second chamber bounded by at least two seals disposed between the housing and a movable element, the movable element being disposed within the first and second chambers, the element adapted to move within the chambers, the seals sealing an outer surface of the moveable element, the seals sealing an inner surface of the housing, and the seals isolating the first chamber from the second chamber when the seals are working properly; and a sensor in fluid connection with the second chamber to measure the second pressure to enable detection of failure of at least one of the seals. Methods are also given for using the apparatus in valves, pumps and other devices to prevent damage and delay due to pressure leakage across a seal due to failure of the seal.

In another embodiment, a method is provided for detecting excessive pressure leakage across a seal due to failure of the seal comprising providing a first chamber disposed within and bounded by a housing, the first chamber containing a fluid at a first pressure that can be measured by a sensor in fluid connection with the first chamber; providing a second chamber containing a lubricant at a second pressure that is less than the first pressure, the second chamber bounded by at least two seals disposed between the housing and a movable element, the movable element being disposed within the first and second chambers, the element adapted to move within the chambers, the seals sealing an outer surface of the moveable element, the seals sealing an inner surface of the housing, and the seals isolating the first chamber from the second chamber when the seals are working properly; and measuring the second pressure with a sensor to enable detection of the start of failure of at least one of the seals.

In yet another embodiment, a method is provided for preventing excessive pressure leakage across a seal due to failure of the seal comprising providing a first chamber disposed within and bounded by a housing, the first chamber containing a fluid at a first pressure; providing a second chamber containing a lubricant at a second pressure that is less than the first pressure, the second chamber bounded by at least two seals disposed between the housing and a movable element, the movable element being disposed within the first and second chambers, the element adapted to move within the chambers, the seals sealing an outer surface of the moveable element, the seals sealing an inner surface of the housing, and the seals isolating the first chamber from the second chamber when the seals are working properly; measuring the second pressure with a sensor to enable detection of the start of failure of at least one of the seals; and replacing the failing seal.

The apparatus and methods of the Invention are used to prevent detrimental unplanned decreasing or ceasing of pumping in oilfield treatments and other operations. The apparatus and methods of the Invention are used to provide early detection or prediction of seal failure in order to allow performance of preventive maintenance and repair before catastrophic failure. This allows increased job reliability and less equipment, and possibly personnel.

DETAILED DESCRIPTION OF ILLUSTRATIVE EMBODIMENTS

Seals, typically dual, but actually varying from one to about ten in number, may be used in a variety of types of equipment, such as pumps, valves, compressors, turbines, agitators, centrifuges, mixers, generators and the like. The Invention will be described primarily in terms of pumps, although it is to be understood that this choice does not limit the scope of the Invention. Downhole operations including fracturing, gravel packing, cementing, water control, and well acidizing and the like require the use of pumping systems. The pumping system typically includes a pump and a fluid (cement, or hydraulic fracturing fluid slurry, or acidizing fluid, or acid fracturing fluid, or the like) provided by a mixing and/or storage tank or a blender. The pump and tank or blender may be transported to the location on a truck or skid (to either of which they could be permanently mounted). In one embodiment, the pump may be a reciprocating pump with a positive displacement mechanism and hydraulic sealing elements.

A terminal device (which can be a computer, read-out monitor, or other device) may be coupled to the pump to monitor operation of the pump. A remote device can also be used. In accordance with some embodiments, the device or remote device receives pressure measurements from one or more predetermined chambers in the pump. A well operator can manually read the measured pressure or pressures to determine whether the pump is operating properly. Alternatively, the terminal or remote device can automatically generate an audible and/or visual alarm if the measured pressure or pressures indicate(s) that a portion of the pump, such as a seal, has failed or will likely fail within a specified predetermined time or at a specified predetermined pressure. This indication can be an indication that a predetermined discrepancy between at least one of the values selected from the group consisting of the high pressure (of the fluid being pumped), the low pressure (on the other side of the seal or seals), the ratio of the high pressure to the low pressure and the difference between the high pressure and the low pressure has exceeded or is about to exceed a predetermined threshold. In some embodiments, the terminal or remote device that measures and displays the pressure data used to detect or predict seal failure can be part of a device used to control the operation of the pump, including slowing or stopping the pump if seal failure is detected or predicted. It is within the scope of the Invention for the operator to use past experience data from the apparatus, including computer manipulation of the data, to predict failures.

Figure 1:
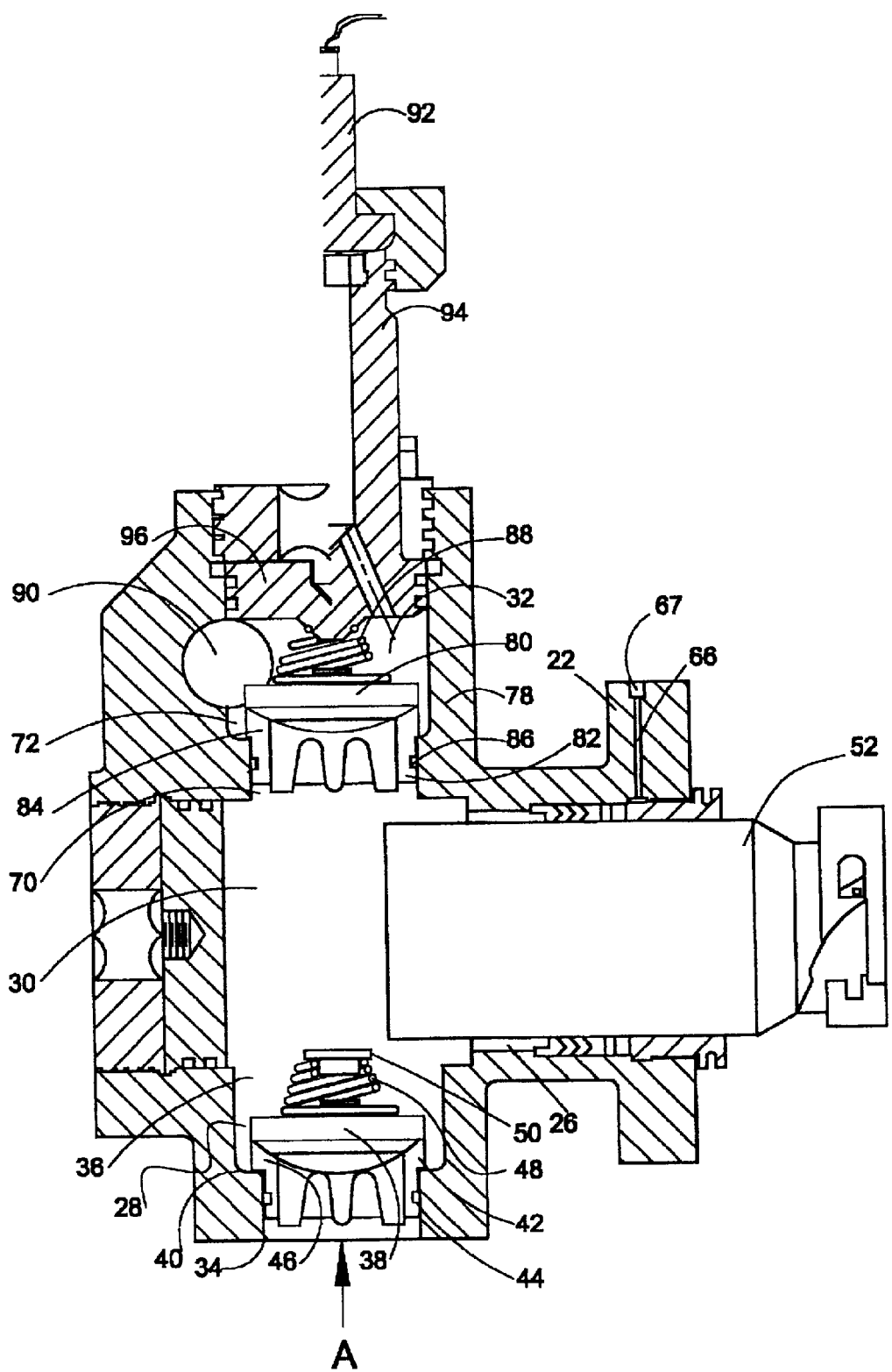
FIG. 1 is a cross sectional view of the fluid end of a pump.

A preferred embodiment is shown in FIG. 1. The orientation in FIG. 1 is for illustrative purposes only; in operation, the apparatus can be in any orientation.

In one embodiment, the fluid end of the pump, as shown in FIG. 1, includes a housing 22 that forms a plunger bore 26 and a chamber that has three regions: chamber regions 28, 30 and 32, which are in communication with the plunger bore 26. The first chamber region 28, having a narrow portion 34 and an open portion 36, is an inlet valve chamber region with an inlet valve 38 disposed therein. The narrow portion 34 of the chamber region 28 connects to the open portion 36 of the chamber region 28 via a shoulder 40.

The inlet valve 38 includes an annular seat 42 with a groove for receiving a seal 44, such as an O-ring, and a flange 46. The seal 44 provides sealing engagement of the walls of the narrow portion 34 of the chamber region 28 to seal the chamber region 28. The flange 46 extends into the open portion 36 of the chamber region 28.

The inlet valve 38 is movable within the chamber region 28. Upward motion of the inlet valve 38 (as oriented in FIG. 1) is opposed by the force applied to the valve 38 by a spring 48 that is supported by a spring support 50. Downward motion of the inlet valve 38 is stopped by the flange 46 contacting the shoulder 40 of the inlet chamber region 28.

The second chamber region 30 is in communication with chamber region 28 and the A plunger bore 26. The chamber region 30 receives a slurry or other fluid from the inlet valve chamber region 28.

The third chamber region 32, in communication with the second chamber region 30 and an outlet port 90, similarly has a narrow portion 70 and an open portion 72. Again, a shoulder 78 joins the narrow portion 70 and the open portion 72. However, this chamber region 32 is an outlet valve chamber region 32 with an outlet valve 80 (sometimes called a discharge valve) disposed therein. The outlet valve 80 includes an annular seat 82 with a groove (not shown) and a flange 84. The groove receives a seal 86, such as an ring, wherein the seal 86 provides sealing engagement of the walls of the narrow portion 70 of the chamber region 32.

The outlet valve 80 is movable within chamber region 32. Upward motion of the outlet valve 80, as oriented in FIG. 1, is opposed by the force applied to the valve 80 by a spring 88 that is supported by discharge cover 96. Downward motion of the outlet valve 80 is stopped by the flange 84 contacting the shoulder 78 of the chamber region 32.

The outlet port 90 is in communication with the outlet valve chamber region 32. Thus, a slurry or other fluid is pumped out of the pump via the outlet port 90.

A plunger 52 is disposed within the plunger bore 26. The right end of the plunger 52, as oriented in FIG. 1, is adapted to attach to a power end of the pump, such as an actuator that is axially movable in and out to move the plunger 52. Thus, in this embodiment, the plunger 52 is a reciprocating plunger, moving into and out of the chamber region 30. Reciprocating motion is achieved in the power end by a slider crank mechanism, but could also be achieved by hydraulic cylinders, pneumatic cylinders, or solenoids.

Figure 2:
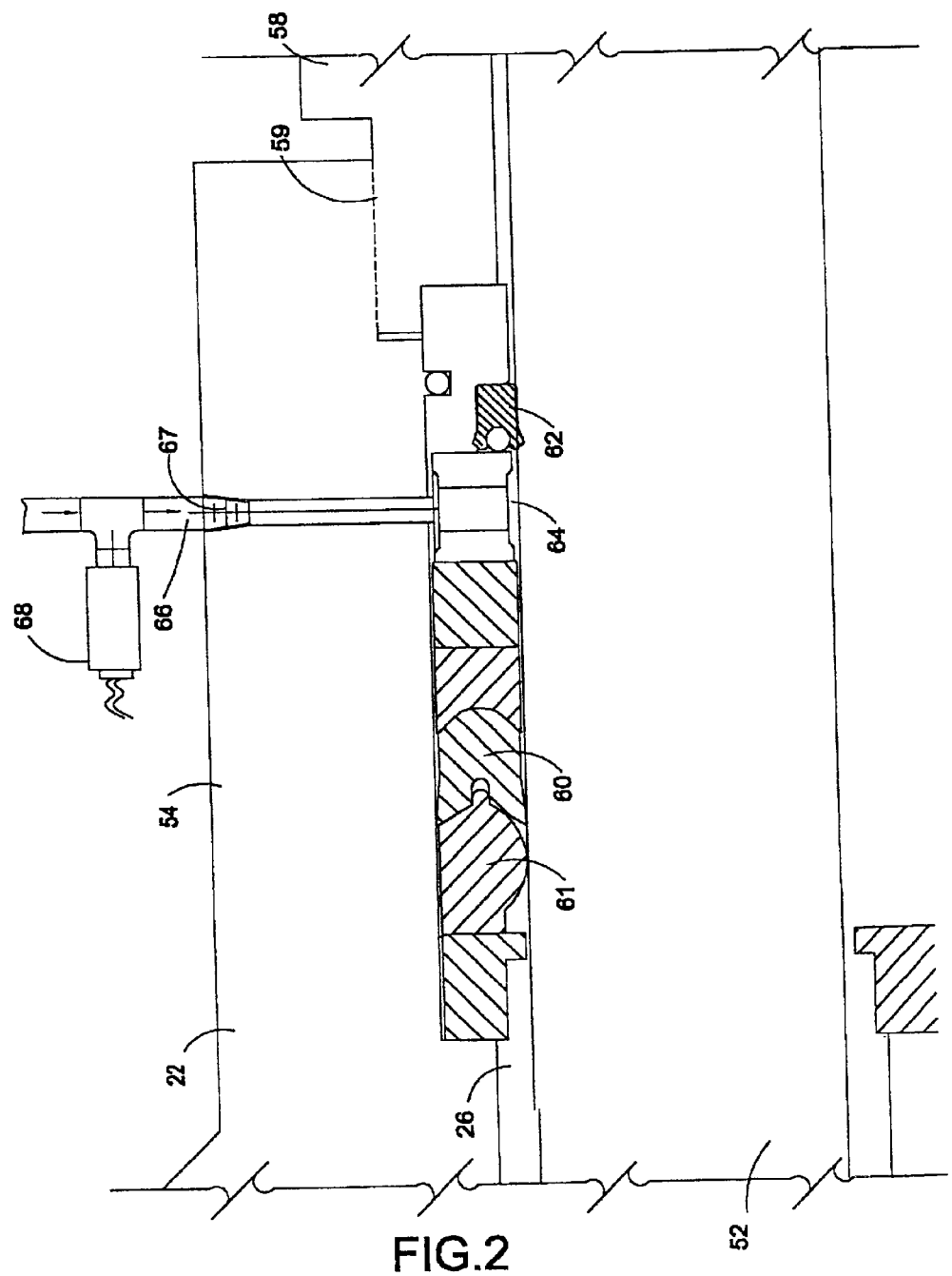
FIG. 2 is a cross sectional view of a plunger and part of a stuffing box in a pump.

Part of the plunger and stuffing box are shown in FIG. 2 in one orientation. A stuffing box 54 defines the plunger bore 26. At one end 59, the stuffing box 54 has inner threads to threadably engage an annular member 58, often called a packing nut A primary seal 60 is disposed within an annular area between the plunger 52 and the inner wall of the stuffing box 54 such that the primary seal 60 provides sealing engagement around the plunger 52. The primary seal 60 is further bounded in the region nearer chamber 30 by a wiper 61 held in place by a spacer, and in the region nearer the end 59 by a female adapter and another spacer.

A secondary seal (wiper) 62 is disposed within the packing nut 58. The primary 60 and secondary 62 seals are spaced apart to form a space 64 or cavity for a lubricant.

The stuffing box 54 also includes a channel 66 leading to an inlet port 67. In the embodiment shown in FIG. 1, the channel 66 is perpendicular to the lubricant cavity 64. In other embodiments, the channel 66, hence its opening port 67, may be on a diagonal to the lubricant cavity 64. The channel 66 provides a conduit for the introduction of lubricant into the cavity 64 to lubricate the primary 60 and secondary 62 seals and the plunger 52. In this embodiment, the lubricant is supplied under a slight positive pressure to inlet port 67 through a line (not shown) from a vessel (not shown) that contains lubricant in the bottom and a pressurizing less dense fluid such as air on the top (in this orientation). This vessel is in turn pressured slightly above ambient, for example at from about one to about five atmospheres, by any method readily available to one of ordinary skill in the art. This system maintains the lubricant pressure essentially constant, relative to the pumping pressure, (unless there is a leak) and maintains the supply of lubricant in the cavity 64. Lubricant may also be supplied by pumps or metering devices.

The lubricant of the present Invention may be a petroleum-based lubricant or a water-soluble lubricant, both commonly referred to as oils. In accordance with some embodiments, a pressure sensor 68, connected in line to the channel 66 as shown in FIG. 2, monitors the pressure, $P_1$, of the lubricant within the cavity 64. The pressure measurement made by the pressure sensor 68 is used to detect failure of the primary seal 60. Thus, the sensor's output may be utilized to warn a well operator that the seal 60 is leaking so that corrective measures may be taken before the seal 60 fails.

When in use, a slurry or other fluid enters the chamber region 30 through the inlet valve 38 (sometimes called the suction valve) due to the withdrawal of the plunger 52 from the chamber region 30. That is, a slurry or other fluid moving in the direction of arrow A lifts the inlet valve 38 due to the force of the slurry or fluid being greater than the force of the spring 48 on the inlet valve 38. The slurry or fluid flows past the valve 38 into the chamber region 30. While the inlet valve 38 is being lifted, the plunger 52 retracts into the plunger bore 26, drawing slurry or fluid into the chamber region 30.

The plunger 52 then reverses direction and enters chamber region 30 causing the outlet valve 80 to be pushed up, in the orientation shown in FIG. 1, thereby enabling communication between the chamber region 30 and the port 90. In other words, when the plunger 52 enters chamber region 30 the outlet valve 80 is lifted. Thus, a slurry or other fluid is pumped past the outlet valve 80 and out the port 90.

Referring to FIG. 2, in this embodiment of the plunger 52 and stuffing box 54 region, the housing 22 includes the chamber region 30 and plunger bore 26. The plunger 52 is disposed within the plunger bore 26. The plunger 52 is adapted to connect to a power end of the pump. The other end of the plunger 52 moves into and out of the chamber region 30. In other words, in this embodiment, the plunger 52 reciprocates within the chamber region 30. The pump operates by a positive displacement mechanism. Thus, a slurry or other fluid in chamber region 32 is at a pressure, $P_2$, the discharge pressure. According to this embodiment, pressure sensor 92 is provided, attached (for example threaded)

to gauge discharge cover 94 to detect pressure $P_2$ in chamber region 32. Pressure sensor 92 is, for example, a standard pressure transducer.

The secondary seal 62 may be disposed within the packing nut 58 to provide sealing engagement with the plunger 52. The primary seal 60 and the secondary seal 62 are spaced apart to provide a cavity 64 for a lubricant. A channel 66 in the housing 22 is in communication with the lubricant cavity 64. In this embodiment, the channel 66 has a wide end and a narrow end and is generally perpendicular to the lubricant cavity 64.

The lubricant may be introduced under pressure $P_1$ into the cavity 64 via the channel 66. As has been mentioned, the pressure $P_1$ is very low (typically from about 1 to about 5 atmospheres) relative to the discharge pressure $P_2$, which may be up to a thousand atmospheres or more. Thus, the pressure between the primary seal 60 and the secondary seal 62 is also effectively pressure $P_1$. The pressure $P_1$ between the primary 60 and secondary 62 seals is much lower than the pump discharge pressure $P_2$ in chamber region 30. Normally, the secondary seal 62 is not capable of withstanding as high a pressure as can primary seal 60, so secondary seal 62 will normally fail first. A function of secondary seal 62 in the present Invention is to provide a lubricant cavity 64 in which pressure $P_1$ is maintained.

In this embodiment, the lubrication system is a closed system that is not vented into the atmosphere. As a result, the pressure in the cavity 64 is the sum pressure of the lubrication system and any pressure due to the leakage of the primary seal 60. In other words, if the seal created by the primary seal 60 is working properly then there is substantially no leakage of pressure from the chamber region 30. As a result, pressure $P_1$ is equal to the pressure under which the lubricant is introduced at inlet port 67.

Since the pressure of the lubricant $P_1$ in the cavity 64 is much lower than the pressure $P_2$ of the fluid or slurry being pumped in the chamber region 30, if the primary seal 60 leaks, pressure escapes from the chamber region 30 into the cavity 64 causing pressure $P_1$ to increase. The pressure differential causes leakage of pressure past the leaking primary seal 60 and into the cavity 64. As a result, the pressure $P_1$ is now the sum of the pressure of the lubricant and the pressure due to leakage past the seal 60.

A pressure sensor 68 is provided to detect the pressure $P_1$ in cavity 64. Monitoring the pressure $P_1$ measured by sensor 68 serves as a warning system for seal 60 failure. When the seal 60 is working properly, the measured pressure $P_1$ is relatively stable and much lower than $P_2$. However, when the seal 60 begins to leak, the measured pressure $P_1$ increases. Thus, when pressure $P_1$ increases above a predetermined point, a warning may be generated at the terminal or remote device. Sensors may be electronic pressure transducers, differential pressure switches, or conventional pressure gauges with electrical contact set points.

Monitoring pressures $P_1$ and $P_2$ by sensors 68 and 92 respectively may also serve as a warning system for seal 60 failure. Although measurement of $P_1$ or $P_2$ alone may be useful, as was discussed earlier, we have found that measurement and comparison of both pressures is preferred, especially when comparing the pump performance in successive jobs, and most especially when those jobs are at different pressures. Pressure sensors 68 and 92 provide pressure $P_1$ and $P_2$ measurements respectively so that the ratio of $P_1$ to $P_2$ ($P_1/P_2$) or the differential between $P_2$ and $P_1$ may be calculated at the user terminal or remote device. Thus, a person operating the pump may be cognizant of a leakage past the primary seal 60 due to the pressure build-up or rise in pressure $P_1$ alone, or the increasing $P_1/P_2$ ratio, or a decrease in the $P_2-P_1$, differential. In turn, the detection of seal 60 leakage may also indicate an impending seal 60 failure.

High-pressure pumps are typically used in oilfield operations at pressures ranging from about 1,000 to about 10,000 pounds per square inch, although some pumps are rated for use at pressures as high as 15,000 pounds per square inch or more. We have found that in normal operation the pressure on the low-pressure side will typically be at about 5 to about 30% of the pressure of the high-pressure side. Thus for most such pumping operations the pressure on the low-pressure side between the seals will range from about 50 to about 3,000 pounds per square inch when the pump and the seals are operating acceptably. This range is so large that it is clear why measurement of $P_1$ alone is not necessarily a reliable indicator of seal failure, especially for job-to-job comparisons. When the pressure on the low-pressure side is consistently at about 30 to about 50% of the pressure of the high-pressure side, seal failure or imminent seal failure is indicated.

Figure 3:
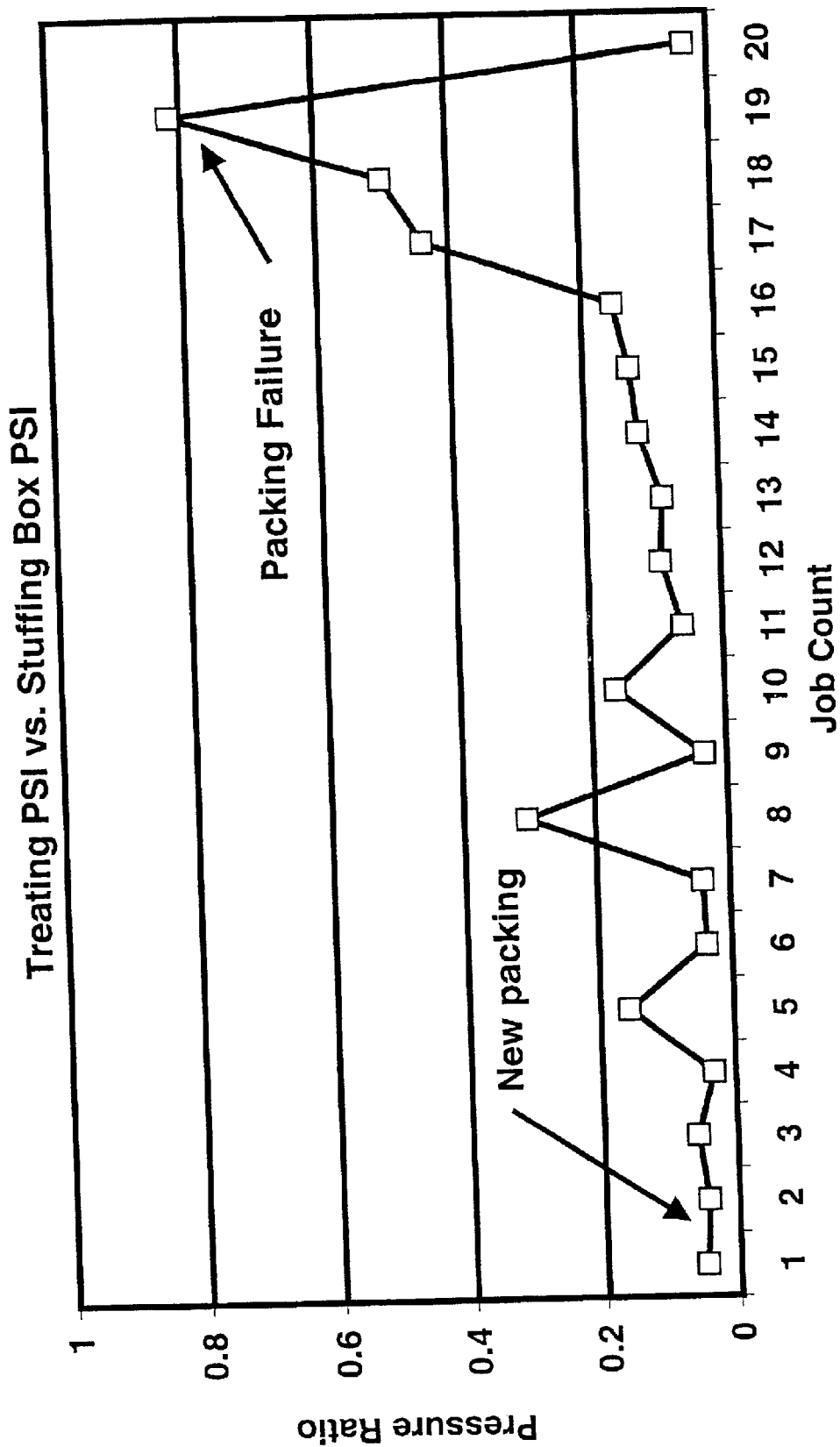
FIG. 3 is a graph representing the pressure ratio of two chambers in a pump as a function of job count

In FIG. 3, the $P_1/P_2$ ratio is plotted against the number of jobs performed by a pump. For the first 16 pumping jobs, the pump lubricant pressure $P_1$ was substantially stable, indicating that the primary seal was working properly and there was substantially no leakage across the primary seal. As used here, "substantially no leakage" does not necessarily connote absolutely no leakage; rather, some small leakage may occur past the seal, but such leakage does not prevent the primary seal from functioning. After about sixteen jobs, in the illustrated example, however, there was a significant, continual rise of pressure in the lubricant cavity as indicated by the change in $P_1/P_2$. This rise in pressure alerted the operator that the primary seal was leaking.

As discussed, a predetermined threshold may be defined so that an increase of $P_1/P_2$ above this threshold is an indication of primary seal failure. Thus, the operator may be forewarned of an impending primary seal failure and can take appropriate measures. Thresholds for absolute or differential pressure may be used similarly.

The apparatus and methods of the Invention find use in many operations, especially oilfield operations. In cementing, cement slurry provided by the cement slurry mixing tank is pumped down the inside of a casing in a wellbore. Once at the bottom, the slurry is then pumped up the wellbore into the annular space between the wellbore wall and the casing. The apparatus and methods of the Invention provide continuous pump function to prevent the formation of voids in the cement and promote good bonding between the wellbore wall and casing. The apparatus and methods of the Invention are used in fracturing (including acid fracturing) to maintain the pumping pressure above the fracture pressure, and above the rate necessary to carry proppant to maximize the effectiveness of the job, until completion of the job. In acidizing the apparatus and methods of the Invention are used to maintain control of the flow rate to prevent wormholing and to optimize placement of the acid where it is most effective. In gravel packing, the apparatus and methods of the Invention are used to ensure that the pumping is continued to ensure even and complete placement of the gravel where up needed.

While the present Invention has been described with respect to a limited number of embodiments, those skilled in the art will appreciate numerous modifications and variations therefrom. For example, the apparatus and methods described will be effective when pressure $P_1$ is above the low range described in the forgoing embodiments or when pressures $P_1$ and $P_2$ are nearly comparable and both either very high or very low, provided that $P_1$ is less than $P_2$. It is intended that the appended claims cover all such modifications and variations as fall within the true spirit and scope of this present Invention.

What is claimed is:

1. An apparatus adapted to detect deficiency of a high pressure sealing system around a movable element, said apparatus comprising a high-pressure seal disposed between a first chamber for a fluid at a high first pressure and said movable element, said apparatus further comprising a second chamber for lubricant forming an annulus around said movable element, said second chamber bounded by said movable element, said high-pressure seal, a low-pressure seal and a housing, said first chamber being separated from said second chamber by said high pressure seal, said second chamber connected to a source of lubricant adapted to introduce said lubricant into said second chamber at a low second pressure less than the pressure in the high-pressure chamber, and a first pressure sensor in fluid connection with said second chamber to enable detection of failure of either the high-pressure seal or the low-pressure seal.

2. The apparatus of claim 1, further comprising a second pressure sensor in fluid connection with said fluid present in the first chamber.

3. The apparatus of claim 1, wherein said movable element is a plunger.

4. The apparatus of claim 3, wherein said plunger is a reciprocating plunger.

5. The apparatus of claim 1, wherein said second chamber is connected to the source of said lubricant through a channel.

6. The apparatus of claim 1 or claim 2, wherein said high-pressure seal and said low-pressure seal are each selected from the group consisting of a single seal, a pair of interconnecting seals, and a set of three interconnecting seals.

7. The apparatus of claim 2, further comprising means to display at least one of the values selected from the group consisting of the high pressure, the low pressure, the ratio of the high pressure to the low pressure and the difference between the high pressure and the low pressure.

8. An apparatus for detecting pressure leakage across a seal comprising:

i. a first chamber disposed within and bounded by a housing, said first chamber containing a fluid at a first pressure;

ii. a second chamber containing a lubricant at a second pressure that is less than said first pressure, said second chamber bounded by at least two seals disposed between said housing and a movable element, said movable element being disposed within said first and said second chambers, said element adapted to move within said chambers, said seals sealing an outer surface of said movable element, said seals sealing an inner surface of said housing, and said seals isolating said first chamber from said second chamber when said seals are working properly; and iii. means for measuring said second pressure to enable detection of failure of at least one of said seals.

9. A method for detecting pressure leakage across a high-pressure seal closing a high-pressure chamber comprising providing a low-pressure chamber bounded by a housing, the high-pressure seal, a low-pressure seal and a movable element, introducing a lubricant into the low-pressure chamber, under a low pressure less than the pressure in the high-pressure chamber, measuring said low pressure and monitoring said low pressure to detect an increase of said low pressure due to a deficiency of the high-pressure seal.

10. The method of claim 9, further comprising measuring the pressure of the high-pressure chamber.

11. The method of claim 10, further comprising monitoring the ratio of the low pressure to the high pressure.

12. The method of claim 10, further comprising monitoring the difference between the high pressure and the low pressure.

13. The method of any of claims 9, 10, 11, 12, further comprising measuring and monitoring at least one of the values selected from the group consisting of the high pressure, the low pressure, the ratio of the high pressure to the low pressure and the difference between the high pressure and the low pressure, comparing said value to a predetermined threshold and providing a signal indicating that said value is associated with a suspected failure of either the high-pressure seal or the low-pressure seal.

14. The method of claim 9 used in an oilfield treatment.

15. The method of claim 14 in which the oilfield treatment is drilling, completion, fracturing, cementing, acidizing or water control.

* * * * *